(12) United States Patent
Schneider et al.

(10) Patent No.: US 7,971,475 B2
(45) Date of Patent: Jul. 5, 2011

(54) METHOD FOR DIAGNOSING AN INTERNAL COMBUSTION ENGINE IN A MOTOR VEHICLE

(75) Inventors: Marcus Schneider, Ludwigsburg (DE); Markus Becker, Stuttgart (DE); Thomas Scheuerle, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 11/986,369

(22) Filed: Nov. 20, 2007

(65) Prior Publication Data

US 2008/0134789 A1   Jun. 12, 2008

(30) Foreign Application Priority Data

Nov. 22, 2006 (DE) .................. 10 2006 055 012

(51) Int. Cl.
*G01M 15/00* (2006.01)
(52) U.S. Cl. ..................................... 73/114.07
(58) Field of Classification Search ............... 73/114.02, 73/114.07, 579, 587; 702/39, 183
See application file for complete search history.

(56) References Cited

U.S. PATENT DOCUMENTS

| | | | | |
|---|---|---|---|---|
| 3,419,820 A * | 12/1968 | Handjani | ...................... | 363/163 |
| 5,329,513 A * | 7/1994 | Nose et al. | .................... | 369/126 |
| 5,574,646 A * | 11/1996 | Kawasaki et al. | ............ | 701/111 |
| 5,689,250 A * | 11/1997 | Kremser | ....................... | 340/904 |
| 5,748,748 A * | 5/1998 | Fischer et al. | ............... | 381/71.4 |
| 5,932,801 A * | 8/1999 | Akishita et al. | ............ | 73/114.02 |
| 6,489,884 B1 * | 12/2002 | Lamberson et al. | ........... | 340/7.2 |
| 6,507,790 B1 * | 1/2003 | Radomski | ....................... | 702/39 |
| 6,718,239 B2 * | 4/2004 | Rayner | ....................... | 701/35 |
| 6,731,675 B2 * | 5/2004 | Nohara et al. | ................ | 375/147 |
| 6,845,161 B2 * | 1/2005 | Boss | ............................... | 381/56 |
| 6,859,539 B1 * | 2/2005 | Maeda | ............................. | 381/86 |
| 7,187,773 B2 * | 3/2007 | Hamada et al. | ................. | 381/56 |
| 7,610,078 B2 * | 10/2009 | Willis | ........................... | 600/424 |
| 7,653,487 B2 * | 1/2010 | Okuda | ........................... | 701/301 |
| 2004/0015251 A1 * | 1/2004 | Hamada et al. | ................. | 700/94 |
| 2005/0201570 A1 * | 9/2005 | Honji | ............................... | 381/86 |
| 2006/0283190 A1 * | 12/2006 | Thomassin et al. | ............ | 60/772 |
| 2007/0049821 A1 * | 3/2007 | Willis | ........................... | 600/437 |
| 2007/0255563 A1 * | 11/2007 | Dooley | ........................... | 704/236 |
| 2007/0256499 A1 * | 11/2007 | Pelecanos et al. | .............. | 73/579 |
| 2008/0086268 A1 * | 4/2008 | Okuda | ........................... | 701/301 |
| 2008/0133177 A1 * | 6/2008 | Klenk et al. | .................. | 702/183 |
| 2008/0146925 A1 * | 6/2008 | Byrd et al. | .................... | 600/438 |
| 2008/0192954 A1 * | 8/2008 | Honji et al. | ..................... | 381/86 |
| 2008/0223135 A1 * | 9/2008 | Blanchard et al. | .............. | 73/579 |

* cited by examiner

*Primary Examiner* — Freddie Kirkland, III
(74) *Attorney, Agent, or Firm* — Kenyon & Kenyon LLP

(57) ABSTRACT

A method for diagnosing an internal combustion engine in a motor vehicle having at least one sensor unit, including at least one sound receiver, the sound receiver converting sound waves into an electrical signal. Sound waves of the internal combustion engine are recorded using the sound receiver of the sensor unit and converted into an electrical signal, and the electrical signal is used for the diagnosis of the operating state of the internal combustion engine.

23 Claims, 1 Drawing Sheet

METHOD FOR DIAGNOSING AN INTERNAL COMBUSTION ENGINE IN A MOTOR VEHICLE

FIELD OF THE INVENTION

The present invention relates to a method for diagnosing an internal combustion engine in a motor vehicle having at least one sensor unit which includes a sound transmitter and a sound receiver, the sound receiver converting sound waves into an electrical signal. The present invention furthermore relates to a device, in particular a control unit, which is designed for carrying out the method, and a computer program having program code for carrying out all steps of such a method.

BACKGROUND INFORMATION

In older motor vehicle models, the driver has the possibility of drawing conclusions regarding possible problems or errors or damage on the basis of the perceived engine noise. For example, a whistling sound of a V-belt may be perceived and a possible error, for example an insufficient tension of the V-belt, may be deduced therefrom. The knocking of a turbocharger may be perceived, etc. Noise insulation in the engine compartment and in the passenger compartment of today's vehicles is, however, so effective that this possibility is almost non-existent, and the driver must rely on the diagnosis, i.e., warning lights of the individual vehicle components or engine components.

SUMMARY OF THE INVENTION

An object of the present invention is to extend the diagnostic capabilities of components of the motor vehicle, in particular of the internal combustion engine and its components.

This object is achieved by a method, a device, and a computer program according to the present invention. In particular, this object is achieved by a method for diagnosing an internal combustion engine in a motor vehicle having at least one sensor unit which includes at least one sound receiver, the sound receiver converting sound waves into an electrical signal, sound waves of the internal combustion engine being recorded by the sound receiver of the sensor unit and converted into an electrical signal, the electrical signal being used for the diagnosis of the operating state of the internal combustion engine. The diagnosis of the operating state includes both a diagnosis for errors, for example, damaged units of the internal combustion engine, and monitoring of performance parameters such as injection times, injection quantities, ignition times, valve opening and closing times, vibrations, and the like. The sound receiver is normally a microphone. It is preferably provided that the sound waves include airborne and/or structure-borne noise. Airborne noise is noise transmitted over the ambient air between the internal combustion engine or the units situated on the internal combustion engine and the receiver; structure-borne noise is similarly transmitted over solid bodies between the internal combustion engine and/or associated units and the receiver. The sound waves preferably include sound waves in the ultrasound range. The sensor unit preferably includes a sound transmitter and a sound receiver. The sensor unit is preferably made up of ultrasound sensors, which are normally used for functions such as parking aid, parking space measuring, etc. The ultrasound sensors have an ultrasound transmitter and an ultrasound receiver, the ultrasound sensor emitting an ultrasound-frequency signal which is reflected by an object located nearby and recorded again by the receiver. The distance to the object is measured on the basis of the propagation time. According to the present invention, the receiver is now operated by itself, i.e., autonomously, and no longer in conjunction with the transmitter as a transceiver system. The sound transmitter and the sound receiver are preferably designed for transmitting and receiving ultrasound, respectively. The sensor unit may be designed as an enclosed module; however, the transmitter and the receiver may also be situated separately in a motor vehicle. Normally a plurality of sensor units are situated in the motor vehicle for distance measurement, for example, two in the front area and two in the rear area, so that a distance may be measured in the area of the left-hand and right-hand front and rear ends of the vehicle. In the method according to the present invention, all sensors located in the motor vehicle, parts of sensors, or only a single sensor may be used for sound measurement. If only one or part of the sensors is used for carrying out the method according to the present invention, one or more sensors may be selected which are situated optimally in the vehicle for transmission of airborne noise or structure-borne noise of the internal combustion engine, for example, receivers of sensors which are close to the internal combustion engine.

It is preferably provided that the use of the electrical signal for the diagnosis of the operating state of the internal combustion engine includes a determination of signal components at predefined frequency spectra. Certain types of interference, errors, or defects of an internal combustion engine or associated units generate additional vibrations and thus additional airborne or structure-borne noise of a certain frequency. If a sound spectrum at a certain frequency recorded by a sensor unit or the receiver of the sensor unit exceeds a maximum amplitude, this indicates a certain associated error. Instead of a frequency, the frequency spectrum may also be compared with a reference spectrum associated with an error of the internal combustion engine, for example, by comparison methods such as pattern matching or by cross-correlation with the reference spectrum. When a maximum amplitude of a spectrum is exceeded, preferably an error message associated with the spectrum is output. Similarly, when a maximum value of a cross-correlation between frequency spectrum and reference spectrum is exceeded, an error associated with the reference spectrum is output.

It is preferably provided that the sound waves of the internal combustion engine are recorded using the receiver of the sensor unit above a minimum velocity of the vehicle. The method according to the present invention is thus not used until a minimum velocity is reached; the method is not used below the minimum velocity.

The above-named object is also achieved via a device, in particular a control unit for an internal combustion engine, which is designed for performing the method according to the present invention, and a computer program having program code for carrying out all steps according to a method according to the present invention if the program is executed on a computer.

The above-named object is also achieved by the use of a sensor unit, in particular an ultrasound distance sensor in a motor vehicle for carrying out a method according to the present invention.

DETAILED DESCRIPTION

Figure 1:
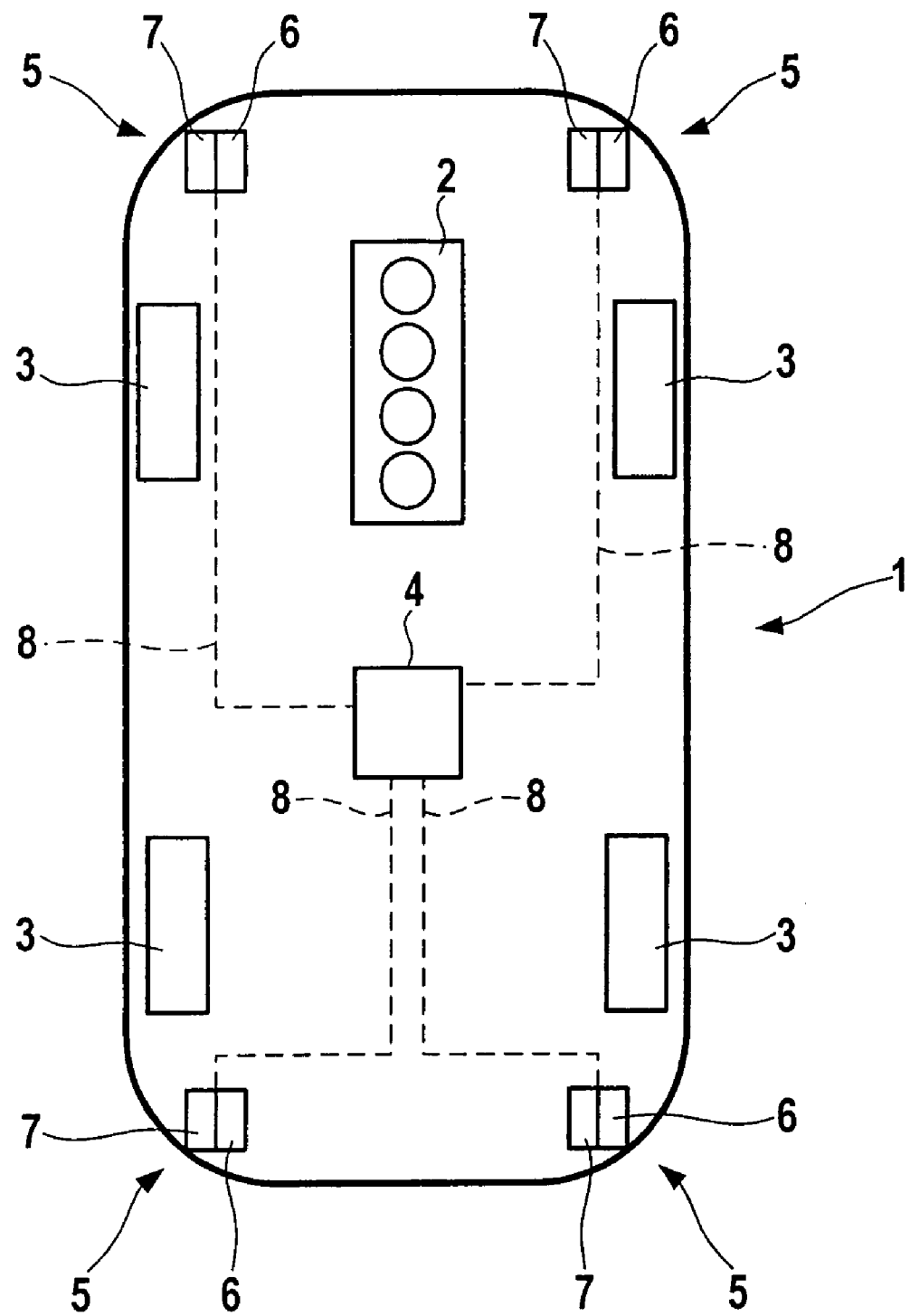
FIG. 1 schematically shows a motor vehicle having sensor units.

FIG. 1 schematically shows a motor vehicle 1 having an internal combustion engine 2, which may be a gasoline engine, a diesel engine, a Wankel engine, or the like, and a transmission, which is not shown in detail, for example, a manual transmission, which is connected to the internal combustion engine via a clutch, or an automatic transmission, the transmission driving driving wheels 3. Motor vehicle 1 includes a control unit 4, which controls all functions, including those of the internal combustion engine. Control unit 4 may be subdivided into individual control units for different functions; there may be, for example, a control unit for the internal combustion engine itself, and a control unit for controlling functions in the passenger compartment and for acoustic and visual outputs, as well as for receiving operating inputs. The motor vehicle includes a plurality of sensor units 5, each of which includes a sound transmitter 6 and a sound receiver 7. Sound transmitter(s) 6 and sound receiver(s) 7 are ultrasound transmitters/ultrasound receivers, for example, known in the related art as parking aid. At least one of sound receivers 7 may also be designed for receiving sound below the ultrasound range. Each of sensor units 5 is connected to control unit 4 via electric lines 8 or, for example, a bus system such as a CAN bus. Sensor units 5 are used, as known, for measuring the vehicle's distance to obstacles, for example, as parking aid or the like. During operation, internal combustion engine 2 generates sound waves which propagate as airborne noise or structure-borne noise. In particular, airborne noise, but, depending on the design of the sensor units, also structure-borne noise of the internal combustion engine in operation may be received by sound receiver 7 of sensor unit 5. Additional precautions may be necessary here, for example, openings or the like for transmitting sound waves from an engine compartment in which internal combustion engine 2 is situated to at least one of sound receivers 7 of sensor units 5.

During operation of the internal combustion engine, sound waves, which are converted into electrical signals by sound receiver 7 and supplied to control unit 4, reach at least one of sensor units 5. The electrical signals may be analyzed, for example, in the time range or frequency range, for example, using a Fourier transform or a fast Fourier transform. The frequency spectrum of the electrical signal and thus the frequency spectrum of the measured sound waves is compared, for example, with reference frequency spectra, the reference frequency spectra being recorded using internal combustion engines in which individual components or individual units of the internal combustion engine are defective. Defective individual components or defective subunits of an internal combustion engine may generate frequency spectra which are different from the original frequency spectrum.

A V-belt, for example, a V-belt for driving a generator of the internal combustion engine, which has too low a tension and begins to slip, generates, for example, a characteristic high-frequency whistling sound. Due to the whistling sound of the V-belt, the signal component of the frequency corresponding to the whistling sound increases considerably, which may be measured with the aid of sound receiver 7 of sensor unit 5. If the amplitude of this spectral component exceeds a maximum amplitude, control unit 4 outputs an appropriate error message, in this case a "V-belt tension too low" message. This error may be set, for example, as an error bit in a control unit and, at the same time or alternatively, indicated by a visual and/or acoustic signal to the driver of the motor vehicle. If this condition, and thus an amplitude above the maximum amplitude, persists for a predefined time period $\Delta t$, a diagnostic unit is started. The diagnostic unit analyzes the signal of the receiver of sensor unit 5 and switches over the sensitivity of the sensors multiple times if necessary. The diagnostic unit thus provides an estimate on the type of defect of the internal combustion engine, in this case a V-belt having too low tension. It is determined on the basis of the engine torque that the error signals also appear if, for example, a turbocharger does not run up to speed, so that the turbocharger running up to speed stands out as a reason for the signal component. As a result, the driver is informed that there may be problems with the V-belt tension.

Another example of application of a method according to the present invention is the monitoring of a turbocharger. For example, a bearing of the turbocharger begins to get worn because of its age. When the engine torque demand increases, the turbocharger starts and generates a high-frequency whistling sound. Due to the whistling sound of the turbocharger, the corresponding signal component having a frequency of the whistling sound increases considerably. If the whistling sound persists for a predefined time period $\Delta t$, i.e., the amplitude of the corresponding frequency is greater than a maximum amplitude for a predefined $\Delta t$, a diagnostic unit is started also in this case. The diagnostic unit analyzes the signal, switches over the sensitivity of the sensors multiple times if necessary, and provides an estimate of the type and possibly the extent of the defect or damage. On the basis of the engine torque, it is determined that the error signals appear only when the turbocharger runs up to speed.

Starting at approximately 50 km/h, sound receivers 7 of the sensor units are switched to a sensitivity such that an error-free engine noise generates only very few signals in the ultrasound range. For this purpose, the sensitivity of sound receiver 7 is reduced compared to its operation as a distance warning device.

What is claimed is:

1. A method for diagnosing an internal combustion engine in a motor vehicle having at least one sensor unit which includes at least one sound receiver, the at least one sound receiver including an ultrasound receiver configured to detect ultrasound, the method comprising:
   recording sound waves of the internal combustion engine using the ultrasound receiver;
   converting the sound waves into an electrical signal using the ultrasound receiver; and
   using the electrical signal for a diagnosis of an operating state of the internal combustion engine;
   wherein the ultrasound receiver is also used one of:
      as a parking aid;
      as a parking space measuring device; and
      for measuring a distance of the vehicle from an obstacle.

2. The method of claim 1, wherein:
   when the motor vehicle travels at a velocity that is less than a predetermined threshold velocity:
      the ultrasound receiver is operated at a first sensitivity at which the ultrasound receiver is used one of as the parking aid and the parking space measuring device; and
      signals of the ultrasound receiver are ignored with respect to the diagnosis of the operating state of the internal combustion engine; and
   the method further comprises, responsive to an increase in the velocity to the threshold velocity, reducing the sensitivity of the ultrasound receiver, and using its signals for the diagnosis.

3. The method of claim 1, wherein signals of the ultrasound receiver are used for at least one of aiding a parking operation and measuring a parking space and are ignored with respect to the diagnosis when the vehicle travels at a velocity that is less than a predetermined threshold velocity, and signals of the ultrasound receiver are used for the diagnosis when the vehicle travels at a velocity that is at least the predetermined threshold velocity.

4. A control unit for diagnosing an internal combustion engine in a motor vehicle having at least one sensor unit which includes at least one sound receiver, the control unit comprising:
   means for recording sound waves of the internal combustion engine using the sound receiver;
   means for converting the sound waves into an electrical signal using the sound receiver;
   means for using the electrical signal for a diagnosis of an operating state of the internal combustion engine; and
   means for reducing a sensitivity of the at least one sensor unit with respect to the diagnosis when the motor vehicle reaches a velocity of approximately 50 km/h, the at least one sensor unit thereafter generating signals in response to noise, a number of the signals generated after the sensitivity reduction being reduced compared to a number of signals the at least one sensor is configured to produce in response to the noise prior to the sensitivity reduction.

5. A non-transitory computer-readable medium having stored thereon a program which, when executed by a processor, performs the following method for diagnosing an internal combustion engine in a motor vehicle having at least one sensor unit which includes at least one sound receiver:
   recording sound waves of the internal combustion engine using the sound receiver;
   converting the sound waves into an electrical signal using the sound receiver;
   using the electrical signal for a diagnosis of an operating state of the internal combustion engine; and
   reducing a sensitivity of the at least one sensor unit with respect to the diagnosis when the motor vehicle reaches a velocity of approximately 50 km/h, the at least one sensor unit thereafter generating signals in response to noise, a number of the signals generated after the sensitivity reduction being reduced compared to a number of signals the at least one sensor is configured to produce in response to the noise prior to the sensitivity reduction.

6. A method for diagnosing an internal combustion engine in a motor vehicle having at least one sensor unit which includes at least one sound receiver, the method comprising:
   recording sound waves of the internal combustion engine using the sound receiver;
   converting the sound waves into an electrical signal using the sound receiver;
   using the electrical signal for a diagnosis of an operating state of the internal combustion engine; and
   reducing a sensitivity of the at least one sensor unit with respect to the diagnosis when the motor vehicle reaches a velocity of approximately 50 km/h, the at least one sensor unit thereafter generating signals in response to noise, a number of the signals generated after the sensitivity reduction being reduced compared to a number of signals the at least one sensor is configured to produce in response to the noise prior to the sensitivity reduction.

7. The method according to claim 6, wherein the sensor unit includes a sound transmitter.

8. The method according to claim 6, wherein the use of the electrical signal for the diagnosis of the operating state of the internal combustion engine includes a determination of signal components at predefined frequency spectra.

9. The method according to claim 8, further comprising comparing the frequency spectrum with a reference spectrum associated with an error of the internal combustion engine.

10. The method according to claim 9, further comprising, when a maximum value of a cross-correlation between the frequency spectrum and the reference spectrum is exceeded, outputting an error associated with the reference spectrum.

11. The method according to claim 8, further comprising, when a maximum amplitude of a spectrum is exceeded, outputting an error associated with the spectrum.

12. The method according to claim 11, further comprising:
   determining that the maximum amplitude is exceeded for more than a predefined time period; and
   responsive to the determining that the maximum amplitude is exceeded for more than the predefined time period, initiating the using of the electrical signal for a diagnosis of an operating state of the internal combustion engine.

13. The method according to claim 6, wherein the sound waves of the internal combustion engine are recorded only when traveling above a minimum velocity of the vehicle, the recording being performed using the sound receiver of the sensor unit, and the minimum velocity being above a standstill.

14. The method according to claim 6, wherein a sensor unit of an ultrasound distance sensor in a motor vehicle is used to carry out the method.

15. The method according to claim 6, wherein the diagnosis is indicative of damage to the internal combustion engine and is indicative of engine performance parameters, the parameters including injection times, injection quantities, ignition times, valve opening and closing times, and engine vibrations.

16. The method according to claim 6, wherein:
   the at least one sound receiver includes an ultrasound receiver configured to detect ultrasound;
   the sound waves of the internal combustion engine are recorded using the ultrasound receiver; and
   the sound waves are converted into the electrical signal using the ultrasound receiver.

17. The method according to claim 16, wherein the sensor unit includes an ultrasound transmitter.

18. The method of claim 17, further comprising:
   disabling the ultrasound transmitter during the recording such that the ultrasound receiver is operated independent of the ultrasound transmitter;
   terminating the recording; and
   both prior to the recording and after terminating the recording, enabling a distance measurement in which the ultrasound transmitter is operated in conjunction with the ultrasound receiver.

19. The method according to claim 17, further comprising:
   terminating the recording; and
   when not recording, using the ultrasound receiver as a distance sensor, wherein a sensitivity level of the ultrasound receiver when being used as a distance sensor is greater than a sensitivity level of the ultrasound receiver during the recording.

20. The method according to claim 16, further comprising:
   adjusting a sensitivity of the ultrasound receiver during the recording, wherein the adjusting is controlled by a diagnosis unit performing the diagnosis.

21. The method according to claim 16, wherein the ultrasound receiver records a distance signal used for outputting a distance warning.

22. The method according to claim 16, wherein the recording of sound waves by the ultrasound receiver includes recording both:
   airborne sound; and
   structure-borne sound transmitted through at least one solid body from the internal combustion engine to the ultrasound receiver.

23. The method according to claim 16, wherein the ultrasound receiver is also used one of:
   as a parking aid;
   as a parking space measuring device; and
   for measuring a distance of the vehicle from an obstacle.

* * * * *